(12) United States Patent
Fiedler et al.

(10) Patent No.: US 11,509,107 B2
(45) Date of Patent: Nov. 22, 2022

(54) METHOD FOR PRODUCING A MULTI-CORE CABLE AND CORRESPONDINGLY PRODUCED CABLE

(71) Applicant: MD ELEKTRONIK GmbH, Waldkraiburg (DE)

(72) Inventors: Tobias Fiedler, Jettenbach (DE); Daniel Koppermueller, Herbertsfelden (DE); Thomas Halbig, Dietfurt (DE)

(73) Assignee: MD ELEKTRONIK GMBH, Waldkraiburg (DE)

( * ) Notice: Subject to any disclaimer, the term of this patent is extended or adjusted under 35 U.S.C. 154(b) by 0 days.

(21) Appl. No.: 17/478,973

(22) Filed: Sep. 20, 2021

(65) Prior Publication Data
US 2022/0102928 A1    Mar. 31, 2022

(30) Foreign Application Priority Data
Sep. 30, 2020   (DE) ...................... 10 2020 125 490.3

(51) Int. Cl.
*H01R 43/24*       (2006.01)
*B29C 45/14*       (2006.01)
(Continued)

(52) U.S. Cl.
CPC ....... *H01R 43/24* (2013.01); *B29C 45/14549* (2013.01); *H01B 7/0009* (2013.01);
(Continued)

(58) Field of Classification Search
CPC .... B60R 16/0207; H01B 7/0045; H01B 7/08; H01B 13/01254; H01B 7/0823; H01B 7/04; H01B 7/083; H01B 7/0846; H01B 9/006; H01B 7/00; H01B 7/02; H01R 43/24; B29C 45/14549
See application file for complete search history.

(56) References Cited

U.S. PATENT DOCUMENTS 5,013,495 A  *  5/1991  Noba .................... G02B 6/3865
                                                     264/328.8
5,279,030 A      1/1994  Ito et al.
(Continued)

FOREIGN PATENT DOCUMENTS

DE              3623927 C1    10/1987
DE        102005042027 A1     3/2007
(Continued)

*Primary Examiner* — William H. Mayo, III
*Assistant Examiner* — Krystal Robinson
(74) *Attorney, Agent, or Firm* — Leydig, Voit & Mayer, Ltd.

(57) ABSTRACT

A method for producing a multi-core cable includes arranging first and second contact elements in a contact carrier having first and second longitudinal channels connecting a contacting side to a cable side, and first and second through-openings respectively crossing the first and second longitudinal channels, and a second through-opening crossing the second longitudinal channel. The first and second longitudinal channels and the first and second through-openings are sealed in a fluid-tight manner by inserting two first sealing pieces into the first through-opening and two second sealing pieces into the second through-opening. In an injection-molding method, a connecting piece is formed connecting the contact carrier to the outer sheath of the cable by overmolding at least a rear section of the contact carrier comprising the first and second through-openings and a section of the cable protruding on the cable side.

13 Claims, 5 Drawing Sheets

(51) Int. Cl.
*H01B 7/00* (2006.01)
*H01B 7/02* (2006.01)
*B29L 31/34* (2006.01)
*H01R 103/00* (2006.01)

(52) U.S. Cl.
CPC ............ *H01B 7/0045* (2013.01); *H01B 7/02* (2013.01); *B29C 2045/14557* (2013.01); *B29L 2031/3462* (2013.01); *H01R 2103/00* (2013.01)

(56) References Cited

U.S. PATENT DOCUMENTS

| | | | |
|---|---|---|---|
| 2005/0014417 A1 | 1/2005 | Karino et al. | |
| 2008/0187274 A1* | 8/2008 | Carlson | C08J 5/121 385/100 |
| 2015/0122544 A1* | 5/2015 | Shiba | H02G 3/0481 174/72 A |
| 2015/0364230 A1* | 12/2015 | Kataoka | H01B 7/02 264/272.11 |
| 2016/0066483 A1* | 3/2016 | Fukuda | H01B 1/02 174/68.3 |
| 2016/0142030 A1* | 5/2016 | Hamner | H03H 7/0115 174/70 R |
| 2016/0189828 A1* | 6/2016 | Oga | B60R 16/0215 174/72 A |
| 2016/0190787 A1* | 6/2016 | Yamasaki | H01B 3/28 174/72 A |
| 2022/0254546 A1* | 8/2022 | Nambara | H01B 7/00 |

FOREIGN PATENT DOCUMENTS

| | | |
|---|---|---|
| EP | 1122840 A1 | 8/2001 |
| EP | 2545616 B1 | 8/2014 |
| WO | WO 2017108803 A1 | 6/2017 |

\* cited by examiner

METHOD FOR PRODUCING A MULTI-CORE CABLE AND CORRESPONDINGLY PRODUCED CABLE

CROSS REFERENCE TO RELATED APPLICATIONS

This application claims benefit to German Patent Application No. DE 10 2020 125 490.3, filed on Sep. 30, 2020, which is hereby incorporated by reference herein.

FIELD

The present invention relates to a method for producing a multi-core cable and to a cable produced in such a method.

BACKGROUND

Cables are used to electrically conductively connect electrical components to one another. Cables may inter alia be used for transmitting electrical signals with low electrical power within the scope of symmetrical or non-symmetrical signal transmission. Such signals may, for example, be exchanged between components, such as control units, sensors or actuators, in a motor vehicle. Cables may, however, also be used for transmitting high electrical powers within the scope of an energy supply.

Within the scope of production, cables are adapted according to their intended purpose. In doing so, the cables may be brought to a desired length and suitably processed at their cable ends. In particular, a support structure can be attached to the cable end in order to locally support or stiffen the cable. Furthermore, a plug connector unit can be attached to the cable end in order to be able to connect the cable to other cables or an electrical component. The plug connector unit can comprise one or more electrical contact elements, such as sockets or contact pins, which may be held in position and electrically insulated from one another by a suitable contact carrier, for example. The support structure can be used, for example, to support the contact carrier on the cable.

DE 10 2005 042 027 A1, for example, describes a method for producing a plug connector, in which contacts are overmolded in a middle region in order to form a front housing section of the plug connector, and cable connection ends of the contacts are overmolded in order to form a rear housing section of the plug connector.

EP 2 545 616 B1 describes a plug connector with an integrally formed support structure.

US 2005/0014417 A1 shows another example of a plug connector produced in an injection-molding method.

SUMMARY

In an embodiment, the present disclosure provides a method for producing a multi-core cable. The cable comprises at least a first core and a second core, and an outer sheath at least partially surrounding the first core and the second core. An end section of an inner conductor of the first core is electrically conductively connected to a first contact element and an end section of an inner conductor of the second core is electrically conductively connected to a second contact element. The method includes: arranging the first contact element and the second contact element in a contact carrier having a contacting side and a cable side, wherein the contact carrier comprises a first longitudinal channel connecting the contacting side to the cable side, a second longitudinal channel connecting the contacting side to the cable side, a first through-opening crossing the first longitudinal channel, and a second through-opening crossing the second longitudinal channel, wherein at least a section of the first contact element is arranged in a front part of the first longitudinal channel extending between the contacting side and the first through-opening, and at least a section of the second contact element is arranged in a front part of the second longitudinal channel extending between the contacting side and the second through-opening; sealing the first longitudinal channel and the first through-opening in a fluid-tight manner by inserting two first sealing pieces into the first through-opening; sealing the second longitudinal channel and the second through-opening by inserting two second sealing pieces into the second through-opening; and forming, in an injection-molding method, a connecting piece connecting the contact carrier to the outer sheath of the cable by overmolding at least a rear section of the contact carrier comprising the first through-opening and the second through-opening and a section of the cable protruding on the cable side.

BRIEF DESCRIPTION OF THE DRAWINGS

Subject matter of the present disclosure will be described in even greater detail below based on the exemplary figures. The figures are merely schematic and not to scale. In the various drawings, the same reference signs designate identical or identically acting features. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
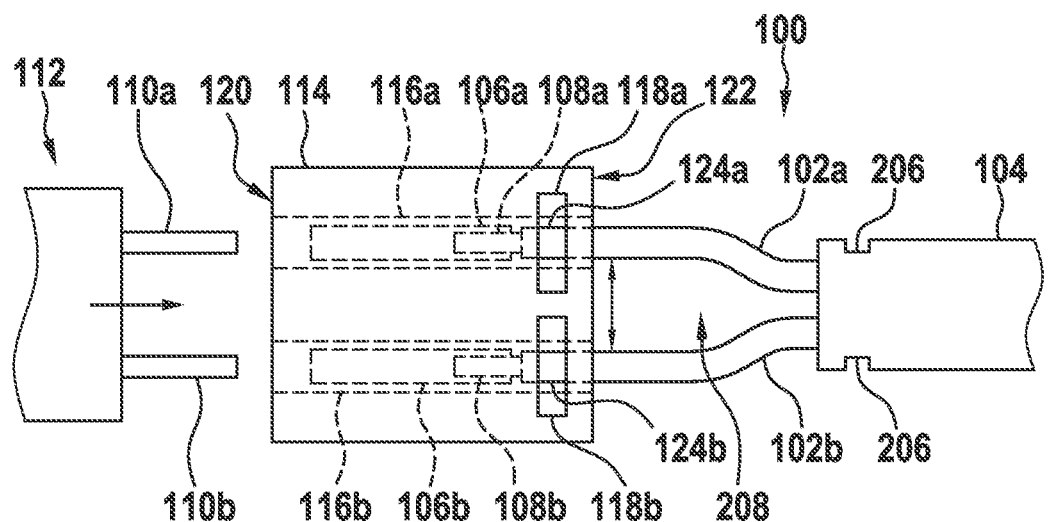
FIG. 1 schematically shows a cable before overmolding in a method according to an exemplary embodiment of the present invention.

In an embodiment, the present invention provides a method for producing a multi-core cable by means of which a cable end of a multi-core cable can be provided with a plug connector robust against buckling and tensile loads in a simple, reliable and/or cost-effective manner. In another embodiment, the present invention provides a correspondingly produced cable.

An embodiment of the present invention provides a method for producing a multi-core cable. The cable has at least a first core and a second core along with an outer sheath at least partially surrounding the first core and the second core. Furthermore, an end section of an inner conductor of the first core is electrically conductively connected to a first contact element, while an end section of an inner conductor of the second core is electrically conductively connected to a second contact element. The method comprises at least the following steps, which may preferably be carried out in the order given: (i) arranging the first contact element and the second contact element in a contact carrier having a contacting side and a cable side, wherein the contact carrier has a first longitudinal channel connecting the contacting side to the cable side, a second longitudinal channel connecting the contacting side to the cable side, a first through-opening crossing the first longitudinal channel and a second through-opening crossing the second longitudinal channel, wherein at least a section of the first contact element is arranged in a front part of the first longitudinal channel extending between the contacting side and the first through-opening, and at least a section of the second contact element is arranged in a front part of the second longitudinal channel extending between the contacting side and the second through-opening; (ii) sealing the first longitudinal channel and the first through-opening in a fluid-tight manner by inserting two first sealing pieces into the first through-opening; (iii) sealing the second longitudinal channel and the second through-opening in a fluid-tight manner by inserting two second sealing pieces into the second through-opening; and (iv) forming a connecting piece connecting the contact carrier to the outer sheath of the cable in an injection-molding method by overmolding at least a rear section of the contact carrier comprising the first through-opening and the second through-opening and a section of the cable protruding on the cable side.

In another embodiment, the present invention provides a cable that can, for example, be produced in a method according to an embodiment of the present invention. The cable comprises: at least a first core and a second core; an outer sheath at least partially surrounding the first core and the second core; a contact carrier having a contacting side, a cable side, a first longitudinal channel connecting the contacting side to the cable side, a second longitudinal channel connecting the contacting side to the cable side, a first through-opening crossing the first longitudinal channel and a second through-opening crossing the second longitudinal channel; a first contact element electrically conductively connected to an end section of an inner conductor of the first core and arranged at least partially in a front part of the first longitudinal channel extending between the contacting side and the first through-opening; a second contact element electrically conductively connected to an end section of an inner conductor of the second core and arranged at least partially in a front part of the second longitudinal channel extending between the contacting side and the second through-opening; and a connecting piece that connects the contact carrier to the outer sheath and was formed in an injection-molding method by overmolding at least a rear section of the contact carrier comprising the first through-opening and the second through-opening and a section of the cable protruding on the cable side.

A core can comprise an electrically conductive inner conductor, for example in the form of a single wire or a strand, i.e., a braid made of several individual wires, and a core sheath made of an electrically insulating material, such as a plastic, in particular a polymer, and surrounding the inner conductor at least partially. The outer sheath of the cable can likewise be made of an electrically insulating material. The cores may, for example, be stripped at their core ends. The contact elements may each be attached to such a stripped core end and thus be electrically conductively connected thereto, for example by welding, soldering and/or crimping.

For example, the first core can be a desired signal core for transmitting a desired signal, and the second core can be a reference signal core for transmitting a suitable reference signal. In other words, the cable can serve for the transmission of differential signals, for example via Ethernet or Low Voltage Differential Signaling (LVDS). Undesired interference signals in both cores, for example as a result of induced voltages or impressed currents, may be virtually completely eliminated in this case by forming a difference between the desired signal and the reference signal.

A first or a second contact element can be an elongated, pin-shaped and/or socket-shaped plug connector element made of an electrically conductive material, such as sheet metal. The contact element can, for example, have a front section either in the form of a socket for receiving a corresponding pin-shaped plug part or in the form of a pin for insertion into a corresponding socket-shaped plug part, while a rear section of the contact element can be electrically conductively connected to the corresponding core. For example, the contact element can be designed as a (sheet-metal) stamped part and/or bent part.

The contact carrier can generally be understood as a housing for receiving the contact elements or as an inner part of an outer housing or plug housing. The contact carrier can be shaped in order to position and/or fix the contact elements relative to one another. In addition, as indicated at the outset, the contact carrier can be shaped as a support structure in order to limit the mechanical load on the cores during plugging and unplugging. The contact carrier can be made of an electrically insulating material. In particular, the contact carrier can be, for example, a plastic molded part. The contact carrier can be manufactured in one piece, for example in an injection-molding method, or can also be composed of several individual parts, for example of two half-shells.

The contact carrier can have several openings, channels or recesses. The contact carrier can inter alia have a longitudinal channel for each contact element, thus a first longitudinal channel and a second longitudinal channel in the case of two contact elements. Such a first or second longitudinal channel can, for example, be an essentially straight connecting channel between the contacting side and the cable side of the contact carrier opposite the contacting side. The two longitudinal channels may be aligned essentially in parallel to one another. For example, when the cable is produced, the contact elements may be inserted from the cable side into the respective longitudinal channel, advanced up to an end position in the direction of the contacting side and fixed, for example latched, in this end position. It is possible for the contact elements to be arranged completely within the respective longitudinal channel in their respective end position. However, it is also possible for a (for example, pin-shaped) front section of the contact elements to protrude in their respective end position from the contact carrier on the contacting side.

Furthermore, at least one through-opening crosses each of the longitudinal channels. Such a through-opening can, for example, be a transverse channel that runs transversely to the respective longitudinal channel and connects, for example, an upper and a lower side or a front and a rear side of the contact carrier to one another. The first and second through-openings can be separate openings in the contact carrier, i.e., openings not connected to one another. Alternatively, the first and second through-openings can be different regions of a single, larger through-opening in the contact carrier that crosses both the first longitudinal channel and the second longitudinal channel.

The two through-openings serve primarily to allow sealing of the contact carrier for a subsequent overmolding of the contact carrier. For this purpose, correspondingly formed sealing pieces are inserted into both through-openings before overmolding. Such a sealing piece can in particular be a sealing tool, i.e., a part that is removed from the cable again after the contact carrier has been overmolded. Alternatively, the sealing pieces can be integral components of the finished cable. For example, the sealing pieces may be inserted into the respective through-opening from opposite sides and brought together until they reach an end position. The sealing pieces may be shaped such that they, in their respective end position, seal in a fluid-tight manner both the respective through-opening at its two ends, that is to say, for example, on the upper and lower sides or the front and rear sides of the contact carrier, and the respective longitudinal channel toward the cable side of the contact carrier. It is possible, for example, for one of the two first or second sealing pieces to function as an anvil, while another of the two first or second sealing pieces functions as a die. In this case, the sealing pieces may be shaped in such a way that they fill in a sealing manner the respective region of a through-opening into which they are inserted. In this case, a sealing piece functioning as an anvil and a sealing piece functioning as a die can in a sealing manner surround the respective core running between these sealing pieces. During subsequent overmolding, liquid injection-molding material, which is usually injected into the injection mold at very high pressures of up to several hundred bars, is thus prevented from entering the front part of the first or the second longitudinal channel from the cable side and penetrating into the respective contact element there, which could impair the operability of the latter.

The contact carrier can be sealed, for example, by means of one or more sealing forks, wherein the sealing pieces may be designed as specially formed sections of such a sealing fork. For example, it is possible for one each of the first sealing pieces and one each of the second sealing pieces to be combined into a respective sealing fork. Alternatively, the sealing pieces may also be designed as individual parts or in another form known to the person skilled in the art. The sealing pieces may also be components of an injection-molding tool, for example.

The connecting piece can be formed by means of an injection-molding tool that, in the closed state, encloses both a section of the contact carrier and a section of the cable protruding from the contact carrier, i.e., encases them in a negative mold representing the connecting piece to be formed. The section of the contact carrier to be overmolded can be a rear section of the contact carrier that faces the cable side and in which the first through-opening and the second through-opening are also arranged. In contrast, a front section of the contact carrier facing the contacting side can be located outside the injection-molding tool or at least outside the negative mold during overmolding. Liquid injection-molding material is thus prevented from penetrating from the contacting side into the longitudinal channels and the contact elements located therein. However, complete overmolding of the contact carrier is also possible (see below). The protruding section of the cable to be overmolded can comprise exposed sections of the first core and of the second core, i.e., sections in which the outer sheath is removed and the respective core sheaths of the two cores are accordingly exposed. These exposed sections may extend in the longitudinal direction of the cable between the cable side and the outer sheath. In addition, one end section of the outer sheath can be overmolded. In particular, the specified exposed sections of the cores may be stabilized, fixed relative to one another, and electrically insulated from one another by the connecting piece. A gap between the two cores can inter alia be filled with the injection-molding material (see below). Furthermore, a tensile load acting on the individual cores can be limited by the connecting piece.

As needed, the connecting piece can, for example, be formed on its outer surface with various functional sections. Such a functional section can, for example, be a recess that is arranged on one or both sides with respect to the through-openings and enables a (possibly automated) visual inspection of the core sections running in the contact carrier. Assembly errors may thus be detected early, for example within the framework of camera testing. A further example of such a functional section are specially formed contours, such as latching lugs, latching grooves, or the like, which may serve to latch a separate plug housing on the connecting piece. Such contours have the advantage that the plug housing can be easily assembled and disassembled.

For forming the connecting piece, a glass-fiber-reinforced plastic or another suitable fiber-plastic composite can, for example, be used as injection-molding material. Depending on the intended purpose, however, other injection-molding materials may also be used to form the connecting piece.

In summary, such a method enables simple, fast and reliable production of a multi-core cable. In particular, integrally forming the connecting piece in an injection-molding method makes it possible to dispense with the use of complex components, such as additional plastic half-shells, additional sealing elements for sealing the contact carrier, or additional, for example wedge-like, spacers for expanding the cable cores. It was shown that the method described here enables simple, fast and reliable production of twisted pair lines with (for example, unshielded) two-core plug connectors, such as are inter alia used for data transmission in motor vehicles.

A cable produced in this way is particularly robust to buckling and tensile loads, in particular in the transition region between the contact carrier and the outer sheath of the cable. In other words, the overmolded connecting piece ensures that sufficient pulling forces may be applied without damaging the cable, for example tearing or breaking individual wires or cores.

Without limiting the scope of the invention in any way, ideas and possible features regarding embodiments of the invention may inter alia be considered to be based on the ideas and knowledge described below.

According to one embodiment, the method comprises removing the first sealing pieces and the second sealing pieces after forming the connecting piece. As mentioned above, the sealing pieces can be removable sealing tools. The sealing pieces may, for example, be designed in such a way that they project from the contact carrier after they have been inserted into the contact carrier up to an end position. These projecting sections of the sealing pieces may, for example, prevent the through-openings from being covered with injection-molding material during overmolding. The removal of the sealing pieces after forming the connecting piece, i.e., after hardening the injection-molding material, results in corresponding recesses in the connecting piece, which are opposite the respective through-openings of the contact carrier or merge into them in alignment. Even after overmolding, accessing or viewing the cores located in the contact carrier is thus possible, for example within the framework of (possibly camera-supported) quality control.

According to one embodiment, a section of a core sheath of the first core protruding into the first through-opening is clamped between the first sealing pieces in order to seal the first longitudinal channel in a fluid-tight manner. Additionally or alternatively, in order to seal the second longitudinal channel in a fluid-tight manner, a section of a core sheath of the second core protruding into the second through-opening can be clamped between the second sealing pieces. For example, the sealing pieces may have correspondingly formed, for example correspondingly rounded recesses, at their ends facing the cores. It is essential that the sealing pieces enclose the respective core sheath in a fluid-tight manner in the clamped state, i.e., form a circumferential fluid-tight sealing edge together with the respective core sheath. The penetration of liquid injection-molding material between the sealing pieces and the respective core sheath can thus be prevented.

According to one embodiment, the contact carrier furthermore has a third through-opening crossing the front part of the first longitudinal channel. Accordingly, the method furthermore comprises fluid-tight sealing of the third through-opening by inserting two third sealing pieces into the third through-opening. Furthermore, in order to form the connecting piece, a section of the contact carrier comprising the third through-opening is overmolded. The third through-opening can serve, for example, to latch the first contact element in the first longitudinal channel. For example, for this purpose, the first contact element can have one or more latching lugs or latching springs. In order to prevent liquid injection-molding material from entering the front part of the first longitudinal channel via the third through-opening and thus penetrating into the first contact element, the third through-opening can be correspondingly sealed on both sides by means of the third sealing pieces. For example, the third sealing pieces may be removed again after forming the connecting piece.

According to one embodiment, the contact carrier furthermore has a fourth through-opening crossing the front part of the second longitudinal channel. Accordingly, the method furthermore comprises fluid-tight sealing of the fourth through-opening by inserting two fourth sealing pieces into the fourth through-opening. Furthermore, in order to form the connecting piece, a section of the contact carrier comprising the fourth through-opening is overmolded. The fourth through-opening can serve, for example, to latch the second contact element in the second longitudinal channel. For example, for this purpose, the second contact element can have one or more latching lugs or latching springs. In order to prevent liquid injection-molding material from entering the front part of the second longitudinal channel via the fourth through-opening and thus penetrating into the second contact element, the fourth through-opening can be correspondingly sealed on both sides by means of the fourth sealing pieces. For example, the fourth sealing pieces may be removed again after forming the connecting piece.

Similarly to what was mentioned above in connection with the first and second through-openings, the third and fourth through-openings can be either separate openings in the contact carrier or different regions of a single, larger through-opening in the contact carrier that crosses both the front part of the first longitudinal channel and the front part of the second longitudinal channel.

According to one embodiment, in the injection-molding method, a gap between a section of the first core protruding from the cable side and a section of the second core protruding from the cable side is filled with an injection-molding material. On the one hand, variations in a distance between the two cores on the cable side, for example as a result of buckling or tensile loads or mechanical vibrations, may thereby be prevented. On the other hand, the electrical or dielectric insulation between the two cores can thereby be improved, since conventional injection-molding material has a significantly higher relative permittivity, for example at least twice as high, as compared to air. This embodiment ultimately ensures that both cores have virtually the same coupling or output impedances as required for transmitting differential signals. In order to ensure as little interference emission as possible and robustness against interference radiation, the protruding sections of the two cores may also be completely embedded in the injection-molding material, whereby the two cores may be fixed at a defined distance from one another. The contact carrier can have a wedge that extends at least partially into the gap, in order to ensure that, for example, during overmolding, the first and second cores are not pushed from their intended position by the injection-molding material. Furthermore, prior to the step of forming the connecting piece, retaining elements may be positioned between the cores in the region of the gap and/or outside the gap on the cores, in order to retain the cores in position during overmolding. At this point, it is particularly preferred that two retaining elements are arranged outside the gap outside the first and second cores, so that the first and second cores extend next to one another between the two retaining elements outside the gap. After the step of molding, the retaining elements may be removed from the first and second cores.

According to one embodiment, the connecting piece is recessed at locations opposite the first through-opening and the second through-opening. In other words, the first or second through-opening can pass through both the contact carrier and the connecting piece. For example, the first or second through-opening can connect an upper and a lower side or a front and a rear side of the connecting piece to one another. As a result, core sections running in the contact carrier can be accessed and/or viewed from the outside, which simplifies quality control, for example.

According to one embodiment, the outer sheath has a profiled end section for producing a positive fit in the longitudinal direction of the cable. In this case, the profiled end section of the outer sheath is overmolded to form the connecting piece. The end section of the outer sheath to be overmolded can, for example, be profiled with one or more grooves, which may extend at least partially in the circumferential direction of the cable. The grooves may, for example, be inserted into the outer sheath with rotary blades. The positive fit can then be produced by filling these groove(s) with the injection-molding material. The connecting piece can thus be connected to the outer sheath in a firmly bonded manner as well as in a positive-locking manner, which increases the robustness of the finished cable with respect to tensile loads.

According to one embodiment, the cable furthermore comprises a plug housing for receiving a plug. In this case, the contact carrier is arranged at least partially in the plug housing. The plug housing can on the one hand serve to protect the components arranged therein from environmental influences and on the other hand to mechanically couple the contact carrier or the contact elements to a corresponding plug. For example, when viewed in the longitudinal direction of the contact carrier, the plug housing can protrude beyond the contact carrier on one or both sides and/or partially or completely enclose the contact carrier in its circumferential direction. In this case, the plug housing can be opened at least to the contacting side. In addition to the contact carrier, at least a section of the connecting piece and/or a section of the cable protruding from the connecting piece can be arranged in the plug housing.

According to one embodiment, the plug housing is fastened to the connecting piece. This has the effect that forces acting on the plug housing during plugging or unplugging are mainly introduced into the relatively stable connecting piece. Damage to the cores or the contact carrier may thus be avoided, for example.

According to one embodiment, the connecting piece has a latching section in which the plug housing is latched. The latching section can comprise suitable contours or structures for connecting the plug housing to the connecting section in a positive-locking and/or force-fitting manner. As indicated above, these can be, for example, latching lugs, latching grooves or the like. The plug housing can thus be positioned and fastened to the connecting piece with little production expenditure. This embodiment also enables a simple disassembly of the plug housing.

According to one embodiment, the connecting piece has a cup-shaped section for receiving a plug. The cup-shaped section of the connecting piece can, for example, protrude beyond the contacting side of the contact carrier and thus together with the contact carrier form a plug socket for receiving the plug. This furthermore simplifies the production of the cable. In particular, the attachment of a separate plug socket to the contact carrier can thereby be omitted.

It is pointed out that possible features and advantages of embodiments of the invention are described in part with reference to a method for producing a multi-core cable, in part with reference to a correspondingly produced cable. A person skilled in the art will recognize that the features described for individual embodiments may be transferred to other embodiments, adapted and/or replaced in an analogous and appropriate manner, in order to arrive at further embodiments of the invention and to possibly attain synergetic effects.

FIG. 1 schematically shows a section of a cable 100 comprising a first core 102a and a second core 102b. The two cores 102a, 102b are partially surrounded by an outer sheath 104 of the cable 100. Furthermore, the cable 100 comprises a first contact element 106a and a second contact element 106b, wherein the first contact element 106a is electrically conductively connected to an end section of an inner conductor 108a of the first core 102a and the second contact element 106b is electrically conductively connected to an end section of an inner conductor 108b of the second core 102b. The contact elements 106a, 106b may be connected to the respective inner conductor 108a and 108b, respectively, by crimping, welding and/or soldering, for example. The contact elements 106a, 106b are furthermore shaped in order to receive a corresponding mating contact element 110a or 110b of a plug 112 to which the cable 100 can be connected. For example, as indicated in FIG. 1, the contact elements 106a, 106b may each have a socket-shaped section for receiving a corresponding pin-shaped section of the mating contact elements 110a or 110b (or vice versa).

The cable 100 furthermore comprises a contact carrier 114 having a first longitudinal channel 116a, a second longitudinal channel 116b, a first through-opening 118a crossing the first longitudinal channel 116a and a second through-opening 118b crossing the second longitudinal channel 116b. The contact carrier 114 has a contacting side 120 and a cable side 122 opposite the contacting side 120. The longitudinal channels 116a, 116b each connect the contacting side 120 to the cable side 122. The two through-openings 118a, 118b may each connect a front side of the contact carrier 114 (in FIG. 1, a side facing the observer) to a rear side of the contact carrier 114 (in FIG. 1, a side facing away from the observer). The through-openings 118a, 118b primarily allow the contact carrier 114 to be sealed by means of suitable sealing pieces, as described in more detail below.

Figure 7:
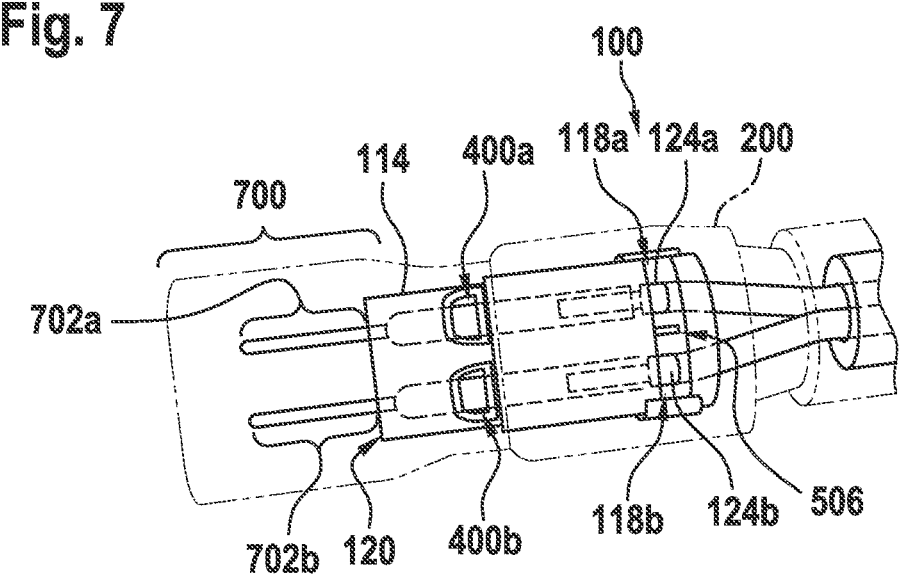
Figure 8:
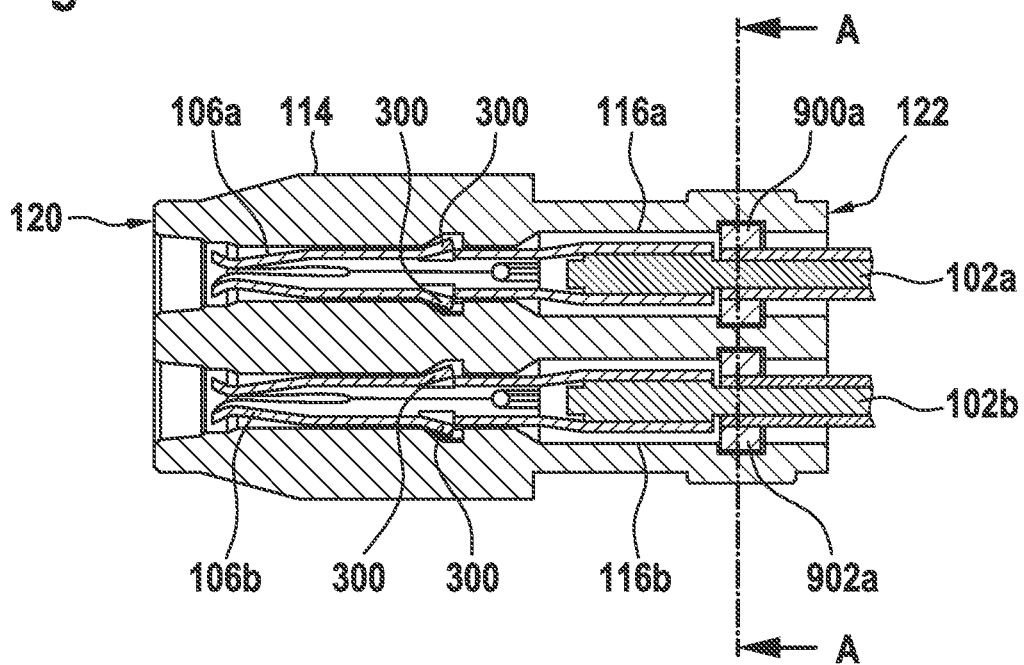
FIG. 8 schematically shows a longitudinal section through a contact carrier of FIG. 4.

The first contact element 106a is arranged in a front part of the first longitudinal channel 116a facing the contacting side 120, wherein the first core 102a protrudes somewhat from the first longitudinal channel 116a on the cable side 122. The second contact element 106b is arranged in a front part of the second longitudinal channel 116b facing the contacting side 120, wherein the second core 102b protrudes somewhat from the second longitudinal channel 116b on the cable side 122. The contact elements 106a, 106b may be arranged completely, as shown in FIG. 1, or even only partially, as shown in FIG. 7, in their respective longitudinal channel 116a or 116b. Furthermore, the contact elements 106a, 106b may be fixed in their respective longitudinal channel 116a or 116b in a specific position, for example by means of spring force and/or latching, as shown in FIG. 8.

The contact elements 106a, 106b may be positioned in their respective longitudinal channel 116a or 116b in such a way that a core sheath 124a of the first core 102a protrudes into a crossing region between the first longitudinal channel 116a and the first through-opening 118a or a core sheath 124b of the second core 102b protrudes into a crossing region between the second longitudinal channel 116b and the second through-opening 118b. The core sheaths 124a, 124b may also protrude through the respective crossing region, as shown in FIG. 1.

The through-openings 118a, 118b may, for example, be wider than the longitudinal channel 116a or 116b crossing them on both sides and may undercut the respective longitudinal channel 116a or 116b on both sides. By way of example, the through-openings 118a, 118b in FIG. 1 each have a slot-like shape with a rectangular cross-section. However, the through-openings 118a, 118b may also be shaped with other suitable cross-sections, for example with a round or trapezoidal cross-section.

Figure 2:
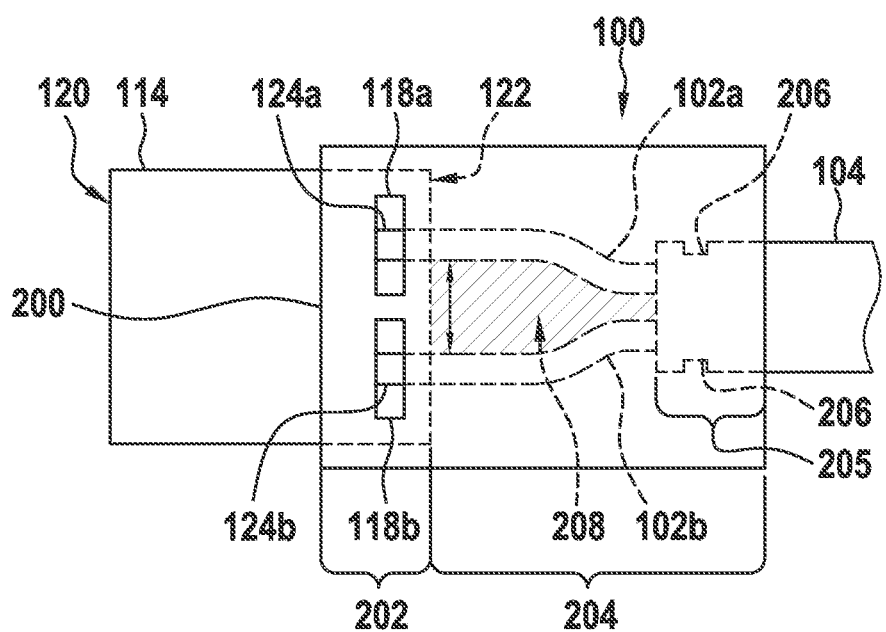
FIG. 2 schematically shows the cable from FIG. 1 after overmolding.

As shown in FIG. 2, the cable 100 also comprises a connecting piece 200 that supports the contact carrier 114 on the outer sheath 104 and reduces the buckling and tensile load on the cores 102a, 102b, for example when the plug 112 is plugged in or unplugged.

The connecting piece 200 is a molded part formed in an injection-molding method by overmolding a rear section 202 of the contact carrier 114 facing the cable side 122 and having the two through-openings 118a, 118b and a section 204 of the cable 100 protruding on the cable side 122 with a suitable injection-molding material. In this case, the connecting piece 200 can enclose an end section 205 of the outer sheath 104.

The injection-molding material can, for example, be a polyamide glass fiber composite. However, other injection-molding materials are also possible.

In order to connect the connecting piece 200 to the outer sheath 104 not only in a firmly bonded manner but additionally in a positive-locking manner, the end section 205 of the outer sheath 104 can be correspondingly profiled. For example, the end section 205 can be profiled with at least one groove 206. The groove 206 can completely or only partially run around the outer sheath 104 in its circumferential direction. The groove 206 can, for example, have been undercut into the outer sheath 104 by means of a suitable cutting tool. By filling the groove 206 with the injection-molding material, a positive fit acting in the longitudinal direction of the cable 100 is finally produced.

The connecting piece 200 can be recessed at locations opposite the through-openings 118a, 118b in such a way that the core sheaths 124a, 124b running in the contact carrier 114 can be seen and/or accessed from the outside through the connecting piece 200. In this case, the connecting piece 200 can be recessed on one side or, as shown in FIG. 2, on both sides.

For example, in order to be able to transmit differential signals via the cores 102a, 102b, it is important that the cores 102a, 102b are arranged on the cable side 122 at a defined distance from one another (marked in FIG. 1 and FIG. 2 by a double arrow), i.e., the two cores 102a, 102b should be separated from one another in this region by a gap 208 having a defined width. In order to fix the cores 102a, 102b relative to one another, the gap 208 can be filled with the injection-molding material during overmolding (see the hatched area in FIG. 2). This prevents the width of the gap 208 from changing, i.e., the cores 102a, 102b from significantly moving laterally relative to one another. The injection-molding material filling the gap 208 also functions as dielectric between the cores 102a, 102b. A permittivity resulting between the cores 102a, 102b can thus be kept largely constant, for example even when bending loads occur. The cores 102a, 102b may also be completely embedded in the injection-molding material between the cable side 122 and the outer sheath 104, as shown in FIG. 2.

Figure 9:
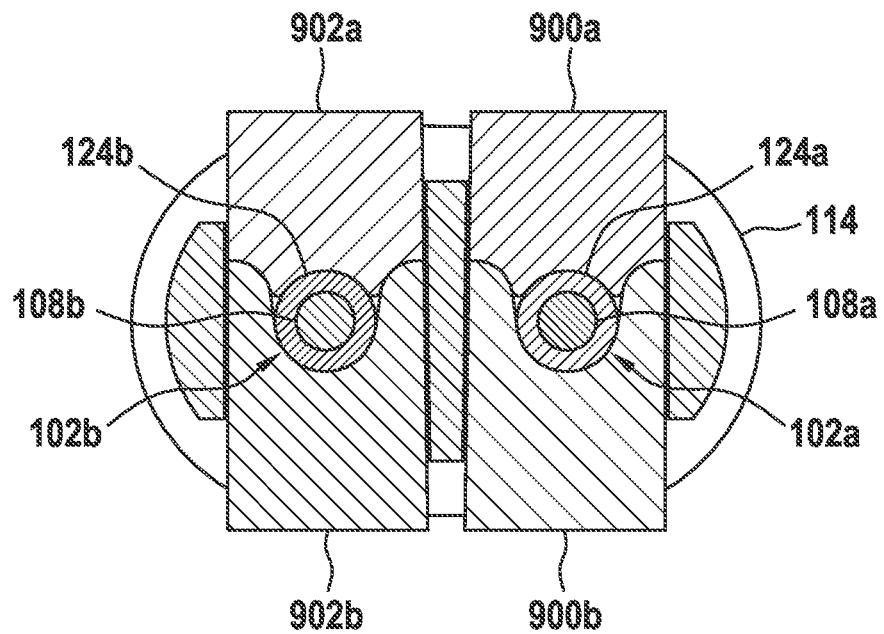
FIG. 9 schematically shows a cross-section through the contact carrier of FIG. 8 along a cutting line A-A.
Figure 10:
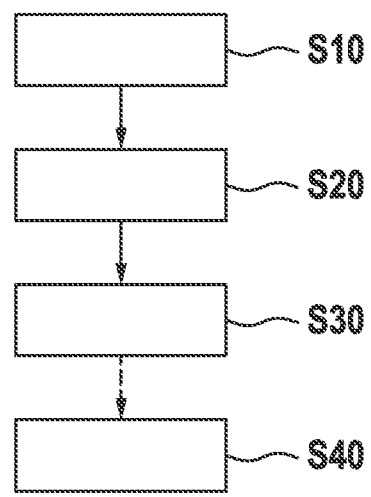
FIG. 10 shows a flow chart to illustrate a method according to an exemplary embodiment of the invention.

Individual steps of a method for producing the cable 100 are described in more detail below with reference to FIGS. 3 to 10. The basic sequence of the method is shown in FIG. 10.

Figure 3:
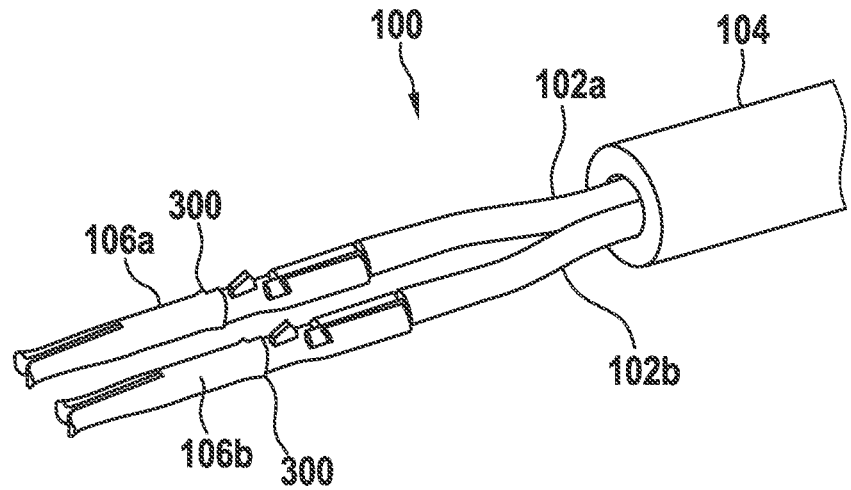
FIGS. 3 to 7 schematically show a cable in various steps of a method according to an exemplary embodiment of the present invention.

FIG. 3 shows an end section of the cable 100 in an initial state before the contact carrier 114 is attached. Each of the contact elements 106a, 106b can, for example, have one or more latching springs 300 for fixing in the contact carrier 114 (see below). By way of example, the contact elements 106a, 106b are designed here as curved sheet-metal stamped parts. However, other embodiments of the contact elements 106a, 106b are also possible.

In step S10, the contact carrier 114 is attached to the cable 100. As already described above with reference to FIG. 1, the contact elements 106a, 106b connected to the respective cores 102a, 102b are inserted into the contact carrier 114 and fixed there by means of the latching springs 300.

Figure 4:
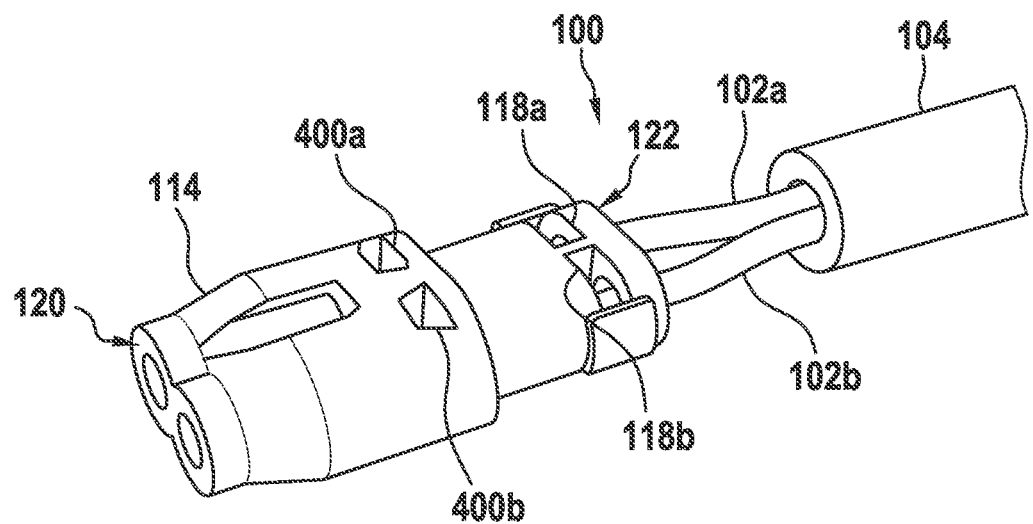

FIG. 4 shows a possible embodiment of a suitable contact carrier 114 after attachment to the cable 100 in step S10. In contrast to FIG. 1, the contact carrier 114 here additionally has a third through-opening 400a crossing the front part of the first longitudinal channel 116a and a fourth through-opening 400b crossing the front part of the second longitudinal channel 116b. The latching springs 300 of the contact elements 106a, 106b are hooked into the respective through-opening 400a or 400b and thus prevent the respective contact element 106a or 106b from slipping in the respective longitudinal channel 116a or 116b.

In order to prevent injection-molding material from entering the front part of the longitudinal channels 116a, 116b receiving the contact elements 106a, 106b, during the subsequent overmolding, corresponding sealing pieces are inserted into the four through-openings 118a, 118b, 400a, 400b in step S20. In this case, two first sealing pieces 900a, 900b are inserted into the first through-opening 118a and two second sealing pieces 902a, 902b are inserted into the second through-opening 118b. Sectional views of the contact carrier 114 with the inserted sealing pieces 900a, 900b, 902a, 902b are shown in FIGS. 8 and 9. By means of the four sealing pieces 900a, 900b, 902a, 902b, it is achieved that liquid injection-molding material does not penetrate into the longitudinal channels 116a, 116b through the through-openings 118a, 118b or from the cable side 122.

In addition, depending on the length of the connecting piece 200 to be formed, two third sealing pieces may be inserted into the third through-opening 400a and two fourth sealing pieces may be inserted into the fourth through-opening 400b, so that no injection-molding material can penetrate into the respective longitudinal channels 116a or 116b via the through-openings 400a, 400b.

FIG. 9 shows that the cores 102a, 102b may be clamped, for example, between the respective sealing pieces 900a, 900b or 902a, 902b, in order to seal the respective longitudinal channel 116a or 116b in a fluid-tight manner. For this purpose, the sealing pieces 900a, 900b or 902a, 902b may be inserted into the respective through-opening 118a or 118b from opposite sides and brought together, for example up to the stop.

The ends of the respective sealing pieces 900a, 900b or 902a, 902b facing the cores 102a, 102b may be contoured in a suitable manner, in particular in such a way that the cores 102a, 102b are enclosed in a fluid-tight manner by the respective sealing pieces 900a, 900b or 902a, 902b in the clamped state.

The sealing pieces may be expediently designed to be conical in their respective longitudinal direction. Reliable sealing of the respective through-opening can thus be achieved.

After the contact carrier 114 has been sealed in step S20, the connecting piece 200 is integrally formed in step S30. For this purpose, a section of the contact carrier 114 to be overmolded is arranged together with a section of the cable 100 to be overmolded in a suitable injection-molding tool, the injection-molding tool is closed, and a cavity delimited by the injection-molding tool is filled with the injection-molding material. The arrangement of the sections to be overmolded in the injection-molding tool can already take place, for example, in step S20. It is also possible for the fluid-tight sealing of the contact carrier 114 to take place by means of the sealing pieces in the injection-molding tool.

Figure 5:
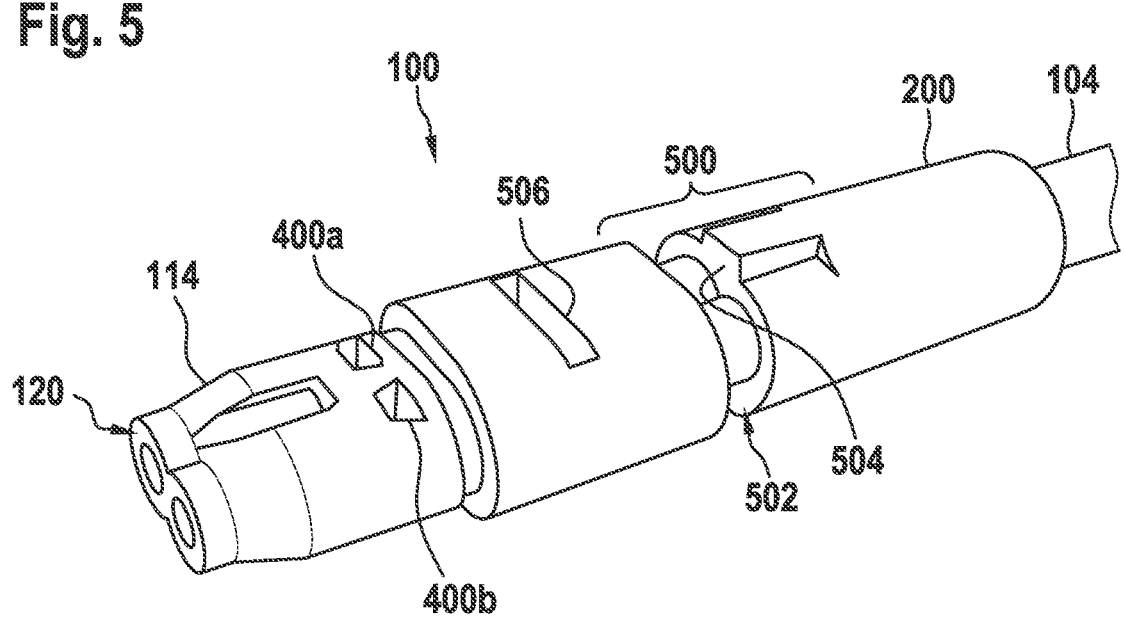

FIG. 5 shows a possible embodiment of a suitable connecting piece 200 after overmolding in step S10. In this example, the overmolded section 202 of the contact carrier 114 comprises only the first through-opening 118a and the second through-opening 118b. The third through-opening 400a and the fourth through-opening 400b have not been overmolded in this case. However, it is possible for the contact carrier 114 to be completely overmolded, as shown by way of example in FIG. 7. In this case, it is necessary for the third through-opening 400a and the fourth through-opening 400b to be additionally sealed in a fluid-tight manner in step S20 by means of the third and fourth sealing pieces, respectively.

Figure 6:
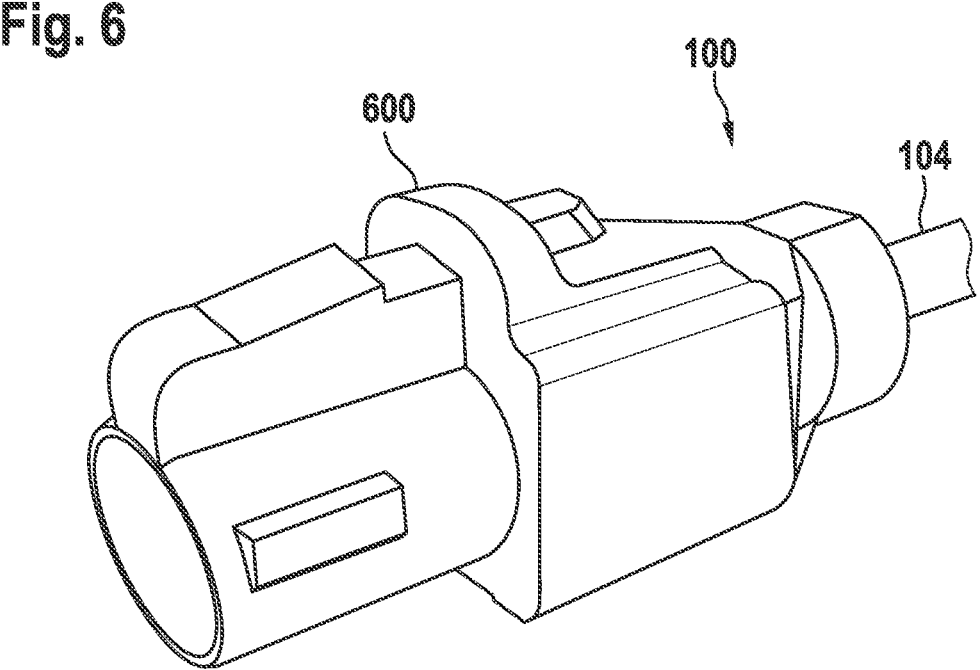

As shown in FIG. 5, the connecting piece 200 can comprise a specially formed latching section 500 for latching a plug housing 600 (see FIG. 6). The latching section 500 can, for example, comprise a circumferential latching groove 502 and/or a stop 504. The stop 504 can serve to limit a displacement path of the plug housing 600 in the longitudinal direction of the cable 100. The stop 504 can, for example, adjoin an edge of the latching groove 502. However, the latching section 500 can also be shaped in another suitable manner.

Furthermore, as already described above with reference to FIG. 2, the connecting piece 200 can have a slot-shaped recess 506 on one or both sides opposite the first through-opening 118a and the second through-opening 118b. The recess 506 can thus inter alia serve as a type of inspection window for (for example camera-supported) visual inspection of the core sections running in the contact carrier 114.

Optionally, in step S40, the plug housing 600 can be fastened to the connecting piece 200, for example by latching the plug housing 600 in the latching section 500 of the connecting piece 200. The plug housing 600 can partially or completely, as shown in FIG. 6, surround the contact carrier 114 with the integrally formed connecting piece 200. The plug housing 600 can be used, for example, as a plug socket for receiving and/or latching the plug 112 (see FIG. 1).

As already mentioned, the contact carrier 114 can also be completely embedded in the connecting piece 200, as shown in FIG. 7. In this case, the connecting piece 200 can protrude beyond the contacting side 120 of the contact carrier 114. In particular, a section 700 of the connecting piece 200 protruding beyond the contact carrier 114 on the contacting side 120 can, for example, have a cup-shaped design and thus form, together with the contact carrier 114, a socket for receiving the plug 112. In this case, the contact elements 116a, 116b may each be designed, for example, with a pin-shaped front section 702a or 702b, which can protrude from the contact carrier 114 on the contacting side 120 or protrude into the cup-shaped section 700 of the connecting piece 200.

Finally, it should be noted that terms such as "having," "comprising," etc. do not exclude other elements or steps and terms such as "a" or "an" do not exclude a plurality. It is furthermore pointed out that features or steps described with reference to one of the above exemplary embodiments may also be used in combination with other features or steps of other exemplary embodiments described above. Reference signs in the claims are not to be considered limiting.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Cable
102a First core
102b Second core
104 Outer sheath
106a First contact element
106b Second contact element
108a Inner conductor of the first core
108b Inner conductor of the second core
110a First mating contact element
10b Second mating contact element
112 Plug
114 Contact carrier
116a First longitudinal channel
116b Second longitudinal channel
118a First through-opening
118b Second through-opening
120 Contacting side
122 Cable side
124a Core sheath of the first core
124b Core sheath of the second core
200 Connecting piece
202 Rear section of the contact carrier
204 Protruding section of the cable
205 End section of the core sheath
206 Groove
208 Gap
300 Latching spring
400a Third through-opening
400b Fourth through-opening
500 Latching section
502 Latching groove
504 Stop
506 Recess
600 Plug housing
700 Cup-shaped section of the connecting piece
702a Front section of the first contact element
702b Front section of the first contact element
900a First sealing piece
900b First sealing piece
902a Second sealing piece
902b Second sealing piece

What is claimed is:

1. A method for producing a multi-core cable, wherein the cable comprises at least a first core and a second core, and an outer sheath at least partially surrounding the first core and the second core, wherein an end section of an inner conductor of the first core is electrically conductively connected to a first contact element and an end section of an inner conductor of the second core is electrically conductively connected to a second contact element, the method comprising:
    arranging the first contact element and the second contact element in a contact carrier having a contacting side and a cable side, wherein the contact carrier comprises a first longitudinal channel connecting the contacting side to the cable side, a second longitudinal channel connecting the contacting side to the cable side, a first through-opening crossing the first longitudinal channel, and a second through-opening crossing the second longitudinal channel, wherein at least a section of the first contact element is arranged in a front part of the first longitudinal channel extending between the contacting side and the first through-opening, and at least a section of the second contact element is arranged in a front part of the second longitudinal channel extending between the contacting side and the second through-opening;
    sealing the first longitudinal channel and the first through-opening in a fluid-tight manner by inserting two first sealing pieces into the first through-opening;

sealing the second longitudinal channel and the second through-opening by inserting two second sealing pieces into the second through-opening; and forming, in an injection-molding method, a connecting piece connecting the contact carrier to the outer sheath of the cable by overmolding at least a rear section of the contact carrier comprising the first through-opening and the second through-opening and a section of the cable protruding on the cable side.

2. The method according to claim 1, further comprising removing the first sealing pieces and the second sealing pieces after forming the connecting piece.

3. The method according to claim 1, wherein:
in order to seal the first longitudinal channel in a fluid-tight manner, a section of a core sheath of the first core protruding into the first through-opening is clamped between the first sealing pieces; and/or
in order to seal the second longitudinal channel in a fluid-tight manner, a section of a core sheath of the second core protruding into the second through-opening is clamped between the second sealing pieces.

4. The method according to claim 1, wherein the contact carrier further comprises a third through-opening crossing the front part of the first longitudinal channel, and wherein the method further comprises:
sealing the third through-opening in a fluid-tight manner by inserting two third sealing pieces into the third through-opening,
wherein, in order to form the connecting piece, a section of the contact carrier comprising the third through-opening is also overmolded.

5. The method according to claim 1, wherein the contact carrier further comprises a fourth through-opening crossing the front part of the second longitudinal channel, and wherein the method further comprises:
sealing the fourth through-opening in a fluid-tight manner by inserting two fourth sealing pieces into the fourth through-opening,
wherein, in order to form the connecting piece, a section of the contact carrier comprising the fourth through-opening is also overmolded.

6. The method according to claim 1, wherein, in the injection-molding method, a gap between a section of the first core protruding from the cable side and a section of the second core protruding from the cable side is filled with an injection-molding material.

7. The method according to claim 1, wherein the outer sheath has a profiled end section configured to produce a positive fit in the longitudinal direction of the cable, and wherein the profiled end section of the outer sheath is overmolded in order to form the connecting piece.

8. A cable comprising:
at least a first core and a second core;
an outer sheath at least partially surrounding the first core and the second core;
a contact carrier that has a contacting side, a cable side, a first longitudinal channel connecting the contacting side to the cable side, a second longitudinal channel connecting the contacting side to the cable side, a first through-opening crossing the first longitudinal channel and a second through-opening crossing the second longitudinal channel;
a first contact element that is electrically conductively connected to an end section of an inner conductor of the first core and is arranged at least partially in a front part of the first longitudinal channel extending between the contacting side and the first through-opening;
a second contact element that is electrically conductively connected to an end section of an inner conductor of the second core and is arranged at least partially in a front part of the second longitudinal channel extending between the contacting side and the second through-opening; and
a connecting piece that connects the contact carrier to the outer sheath and was formed in an injection-molding method by overmolding at least a rear section of the contact carrier comprising the first through-opening and the second through-opening and a section of the cable protruding on the cable side.

9. The cable according to claim 8, wherein the connecting piece is recessed at locations opposite the first through-opening and the second through-opening.

10. The cable according to claim 8, further comprising a plug housing configured to receive a plug, wherein the contact carrier is arranged at least partially in the plug housing.

11. The cable according to claim 10, wherein the plug housing is fastened to the connecting piece.

12. The cable according to claim 11, wherein the connecting piece has a latching section and the plug housing is latched in the latching section.

13. The cable according to claim 8, wherein the connecting piece has a cup-shaped section for receiving a plug.

* * * * *